2,951,050
LUBRICATING OIL ADDITIVES

Peter Joseph Vermont James Agius and Peter R. Morris, both of Abingdon, England, assignors to Esso Research and Engineering Company, a corporation of Delaware No Drawing. Filed Oct. 31, 1956, Ser. No. 619,406

4 Claims. (Cl. 260—23)

This invention relates to lubricating compositions and more particularly to lubricating compositions containing soluble nitrogen-containing additive compounds, and also to processes for preparing such additive compounds.

The use of additives to improve the detergency, e.g. the sludge suspension properties, of lubricating oils is well known. Such compounds, when added to lubricating oils used in internal combustion engines, also inhibit corrosion, cylinder wear, and the formation of varnish and carbon on the working parts of the engine. Well known types of additive compounds used for such purposes are those containing sulfur and a metal. While metal-containing detergent additives are useful, their incorporation in large quantities or their use under severe engine conditions may result in the formation of a high ash residue within the engine, with consequent lowering of engine efficiency.

It has now been discovered that oil-soluble additive compounds which impart detergent properties to lubricating oils containing them, and which are not conducive to the formation of ash within an engine may be obtained by partially esterifying polyvinyl alcohol with one or more carboxylic acids or their derivatives and converting the hydroxyl groups which are not esterified to nitrogen-containing groups.

The polyvonyl alcohol used in obtaining the additives of the present invention is represented by the general formula $$(CH_2 \cdot CH \cdot OH)_n$$

where $n$ is an integer and, according to the present invention, is preferably between 10 and 1,000 and, more particularly, is between 20 and 400. It preferably has a true molecular weight between about 500 and 50,000, particularly between about 1,000 and 20,000. Chain terminating groups depend upon processing conditions and are seldom known. These can be, for example, hydrogen or a catalyst fragment.

To insure oil-solubility of the final product, the polyvinyl alcohol is partially esterified with one or more carboxylic acids or their derivatives. Such acids can be straight-chain or branched, saturated or unsaturated molecules. They can be aromatic, alkylated-aromatic or aromatic substituted aliphatic carboxylic acids. Preferably, aliphatic, saturated or unsaturated, mono-carboxylic acids are used. The acids or derivatives used for esterifying the polyvinyl alcohol preferably have from 8 to 24 carbon atoms, and more preferably from 12 to 20 carbon atoms per molecule. The high molecular weight carboxylic acids contemplated in this invention are the saturated and unsaturated fatty acids that are commonly known in the art. Suitable fatty acids include caprylic, capric, lauric, myristic, palmitic, stearic, the various hydroxy stearic acids, linoleic acid, oleic acid and the like. Naturally occuring fatty acids, such as fish oil acid, tallow acids and coconut oil acids may also be used directly or after hydrogenation. The preferred acids are oleic acid, stearic acid and lauric acid.

The polyvinyl alcohol used in the preparation of the compounds of the present invention preferably has between 30% and 95% of the hydroxyl groups esterified. A particularly useful compound is obtained from polyvinyl alcohol esterification in which about 75% of the hydroxyl groups are esterified with a fatty acid.

The hydroxyl groups of the polyvinyl alcohol which are not esterified are, according to this invention, converted into nitriles by any well known chemical method.

For example, cyano-ethyl esters are used to form nitrogen-containing additives. These are obtained by reacting the hydroxyl groups of polyvinyl alcohol with acrylonitrile, in the presence of caustic soda. This reaction is represented by the equation:

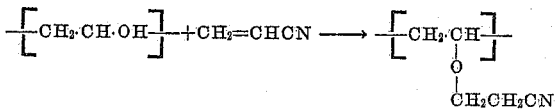

The lubricating oils in which the additive compounds of the present invention can be used comprise mineral oils, lubricating oils derived from animal or vegetable sources and synthetic lubricating oils, such as diesters, complex esters, formals, or blends thereof.

Mineral base lubricating oils ranging in viscosity from about 30 to about 1,000 S.S.U. at 100° F. are preferably employed as the base oils for the compositions of the invention. These naturally occurring mineral lubricating oils may be derived from any petroleum crude source, whether paraffinic or naphthenic in type, and may be refined by any of the known refining techniques of the petroleum industry.

The invention is not limited, however, to the use of mineral base oils, since various synthetic oils having at least 30 Saybolt Universal seconds viscosity at 100° F. may also be used as part or all of the base oils. Examples of operable synthetic lubricating oils include ether alcohols, such as those corresponding to the general formula:

$$RO(C_nH_{2n}O)_xH$$

wherein R is an alkyl group, $n$ is an integer from 2 to 5, and $x$ is an integer from 1 to 40, e.g., the mono-butyl ether of tetradeca-propylene glycol, esters of monobasic carboxylic acids, totaling 20 to 80 carbon atoms, such as those of $C_4$ to $C_{18}$ aliphatic acids with $C_4$ to $C_{18}$ aliphatic alcohols, the $C_4$ to $C_{18}$ radicals including the butyl iso-butyl, hexyl, octyl, iso-octyl, 2-ethyl hexyl, nonyl, decyl, lauryl, stearyl and similar radicals; diesters of dibasic acids, such as adipic or sebacic acid with monohydric alcohols, such as hexyl, octyl, 2-ethyl hexyl or higher alcohols; esters of polyethylene glycols with $C_8$ to $C_{18}$ branched-chain carboxylic acids; complex esters of polybasic carboxylic acids, polyhydric alcohols, and monobasic acids and/or monohydric alcohols, such as the glycol-centered or dibasic acid-centered complex esters; phosphoric acid esters or thioesters of aliphatic alcohols or mercaptans of up to about 18 carbon atoms; halocarbon oils, such as the polymers of chlorofluoro alkylenes like chlorotrifluoroethylene; organo-siloxanes, sulfite esters, organic carbonates, mercaptals; formals, and the like.

A sludge-suspending amount, generally about 0.005 to 10 wt. percent, preferably about 0.5 to 2 wt. percent of the additive compounds of the present invention can be incorporated directly into the lubricating oils in which they are to be used, or they may be added thereto in the form of an oil concentrate.

In preparing the additive compounds of the present invention, the polyvinyl alcohol is either first esterified with the carboxylic acids, the remaining hydroxyl groups then being converted to nitriles, or the polyvinyl alcohol is reacted to convert hydroxyl groups into nitriles, the remaining hydroxyl groups then being esterified.

Esterification can take place, if desired, with carboxylic acid derivatives, such as the chlorides, though other well known methods of esterification can be employed.

While the additive compounds of the present invention are mainly intended as detergent compounds, by incorporating straight-chain groups in the polymeric compounds the final compounds can be endowed with V.I. and pour depressant improvement properties, as well as detergent properties. This is achieved, for instance, by incorporating straight-chain alkyl groups, particularly those containing 8 to 18 carbon atoms.

The present invention can be further understood by reference to the following examples:

Example I

In this example, 44 parts by weight of polyvinyl alcohol were charged with 228 parts of stearoyl chloride, i.e. in sufficient proportions to give 75% esterification of the alcohol. 10% by weight of pyridine was added, to absorb HCl formed during the reaction. The reactants were refluxed at temperature of 75° to 80° C. for 4 hours. Excess water was added to precipitate the partly esterified product, which was filtered and washed with hot water. The partial ester was then dried.

30 parts by weight of the partial ester was refluxed with 3 parts by weight of acrylonitrile and a 2% solution of caustic soda for 7 hours. The product was then water-washed and filtered, and finally recrystallized from a mixture of methylated spirits and water, to give a pure-white product, designated "A."

5% by volume of the product "A" was dissolved in an SAE 30 paraffinic mineral oil, and its dispersancy evaluated by determining the amount of dry used engine oil sludge that the solution would maintain in suspension, using 10 grams of dried used oil sludge and 90 grams of the blend of the present invention. The dispersancy test was of the usual type. In this instance 10 grams of sludge and 90 grams of oil containing 5% by volume of the additive of this invention (product "A") were heated to 200° F. in an oil bath under constant stirring. The mixture was allowed to settle for 24 hours at 200° F. After settling, the top 25 ccs. of the mixture were poured off into a centrifuge tube and diluted with hexane to a total volume of 100 cc. The mixture was then centrifuged and the solids collected in order to evaluate the sludge suspending ability of the oil blend. The results are as follows:

| | Percent sludge suspended |
|---|---|
| SAE 30 base oil | 2 |
| SAE 30 base oil+5% of "A" | 35 |

Example II

Polyvinyl alcohol of molecular weight about 10,000 was heated for 4 hours at 90° C. with stearoyl chloride and pyridine. The pyridine was present to absorb hydrochloric acid formed during the reaction. The amount of stearoyl chloride used was calculated to give 75% esterification. The amount of pyridine used was 10% by weight, based on the total charge. Carbon tetrachloride was used as a solvent. The partial ester formed was precipitated with heptane, filtered and washed and dried under reduced pressure. It was soluble in a SAE 30 grade solvent extracted paraffinic oil. The partial ester was reacted with 10% by weight of acrylonitrile in the presence of 40 mls. of 2% NaOH, refluxed for 7 hours, filtered, washed and dried.

The resulting product, when dissolved in mineral lubricating oils, also was found to have excellent detergent properties.

Example III

A one-stage preparation was used in which polyvinyl alcohol was esterified with 75% theoretical of lauroyl chloride at 70° C. for 4 hours. The polyvinyl alcohol was obtained from Schoninigan Ltd., as grade PVA 27, and had a maximum acetate residual content of 2.5% and a viscosity at 20° C. in 4% aqueous solution of 5 centipoises.

After esterification, 10% by weight of acrylonitrile was then added, with further heating to 90° C. for 6 hours. The product obtained was precipitated with heptane, washed and dried.

1.5% of the product finally obtained was dissolved in a SAE 30 grade solvent extracted paraffinic oil and its dispersancy evaluated by means of the test described in Example I. The product was found to have excellent detergent properties.

The above examples show that compounds obtained by partially esterifying polyvinyl alcohol with carboxylic acids or their derivatives and converting the hydroxyl groups which are not esterified to nitrogen-containing groups, have excellent detergent properties when dissolved in lubricating oil.

It is to be understood that the above described compositions and processes are but illustrative of the application of the principles of the invention. Numerous other compositions and procedures may be devised by those skilled in the art without departing from the spirit and scope of the invention. For example, nitriles can also be prepared by heating halogen substituted groups with potassium cyanide in aqueous alcohol solution.

The hydroxyl groups of the polyvinyl alcohol which are not esterfied can, according to this invention, be converted into nitrogen-containing groups other than nitriles. Primary amines can be produced by reduction of the nitrile or by other well known methods and mixed primary, secondary and tertiary amines by reacting a polyvinyl halide with ammonia or amines. Amides can be produced by conversion of the hydroxy group to the acid chloride, for example thionyl chloride, followed by ammoniolysis by ammonia. Substituted carbamates can be obtained by reacting polyvinyl alcohol with a substituted ixo-cyanate. Amido-acid esters can be obtained by esterifying the polyvinyl alcohol with an amido acid. The product can be converted to the amino-acid ester by reaction with sodium hypobromite.

What is claimed is:

1. An oil soluble material useful as a detergent additive in lubricating oil which is a partial ester of a polyvinyl alcohol having a molecular weight of 500 to 50,000 and material selected from the group consisting of carboxylic acids and acyl halides having from 8 to 24 carbon atoms per molecule, wherein about 30 to 95% of the hydroxyl groups of said alcohol are esterified and wherein the remaining hydroxyl groups are replaced by cyanoethoxy radicals.

2. An oil soluble material according to claim 1, wherein said partial ester is the esterification product of said polyvinyl alcohol and stearoyl chloride.

3. An oil soluble material according to claim 1, wherein said polyvinyl alcohol has a molecular weight between 1,000 and 20,000 and the carbon atom content of said material used to partially esterify said alcohol is 12 to 20 carbon atoms per molecule.

4. A method of preparing the material of claim 1 which comprises partially esterifying said polyvinyl alcohol with a material selected from the group consisting of carboxylic acids and acyl halides having from 8 to 24 carbon atoms per molecule in a molar proportion such that 30 to 95% of the hydroxyl groups of said alcohol are esterified and then reacting said partially esterified polyvinyl alcohol with acrylonitrile in the presence of caustic soda to thereby convert all of the remaining hydroxyl groups of said partial ester to nitrile groups.

(References on following page)

References Cited in the file of this patent

UNITED STATES PATENTS

| | | |
|---|---|---|
| 2,341,553 | Houtz | Feb. 15, 1944 |
| 2,473,124 | Adelson et al. | June 14, 1949 |
| 2,653,133 | Catlin | Sept. 22, 1953 |
| 2,737,496 | Catlin | Mar. 6, 1956 |
| 2,749,312 | Hollyday | June 5, 1956 |
| 2,800,450 | Bondi et al. | July 23, 1957 |
| 2,800,452 | Bondi et al. | July 23, 1957 |

OTHER REFERENCES

Paint, Oil and Chemical Review, Aug. 13, 1953, pages 24–26.

A New Class of Polymeric Dispersants for Hydrocarbon Systems, E. I. du Pont de Nemours and Co., Wilmington, Delaware, Mar. 23 to Apr. 1, 1954.